UNITED STATES PATENT OFFICE.

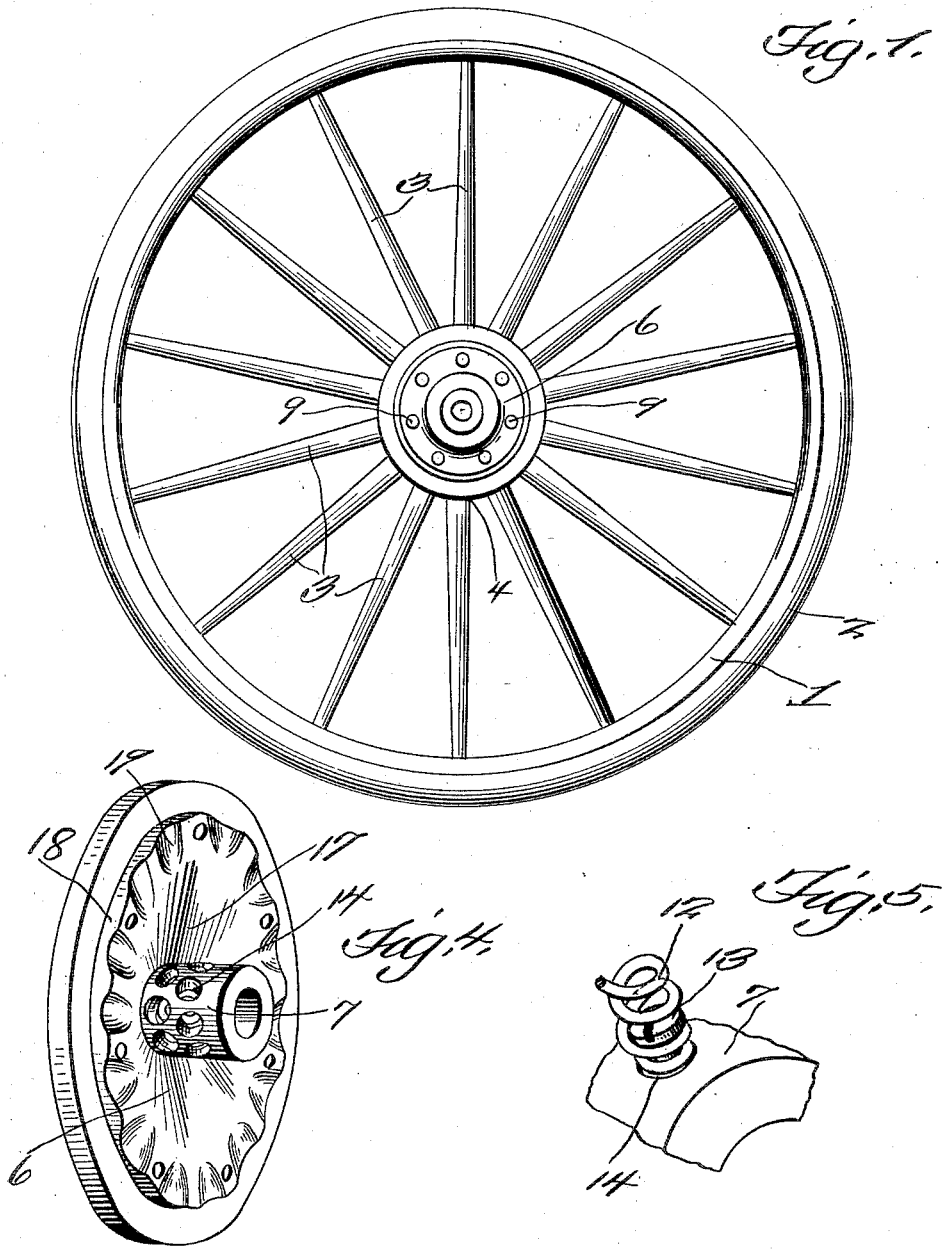

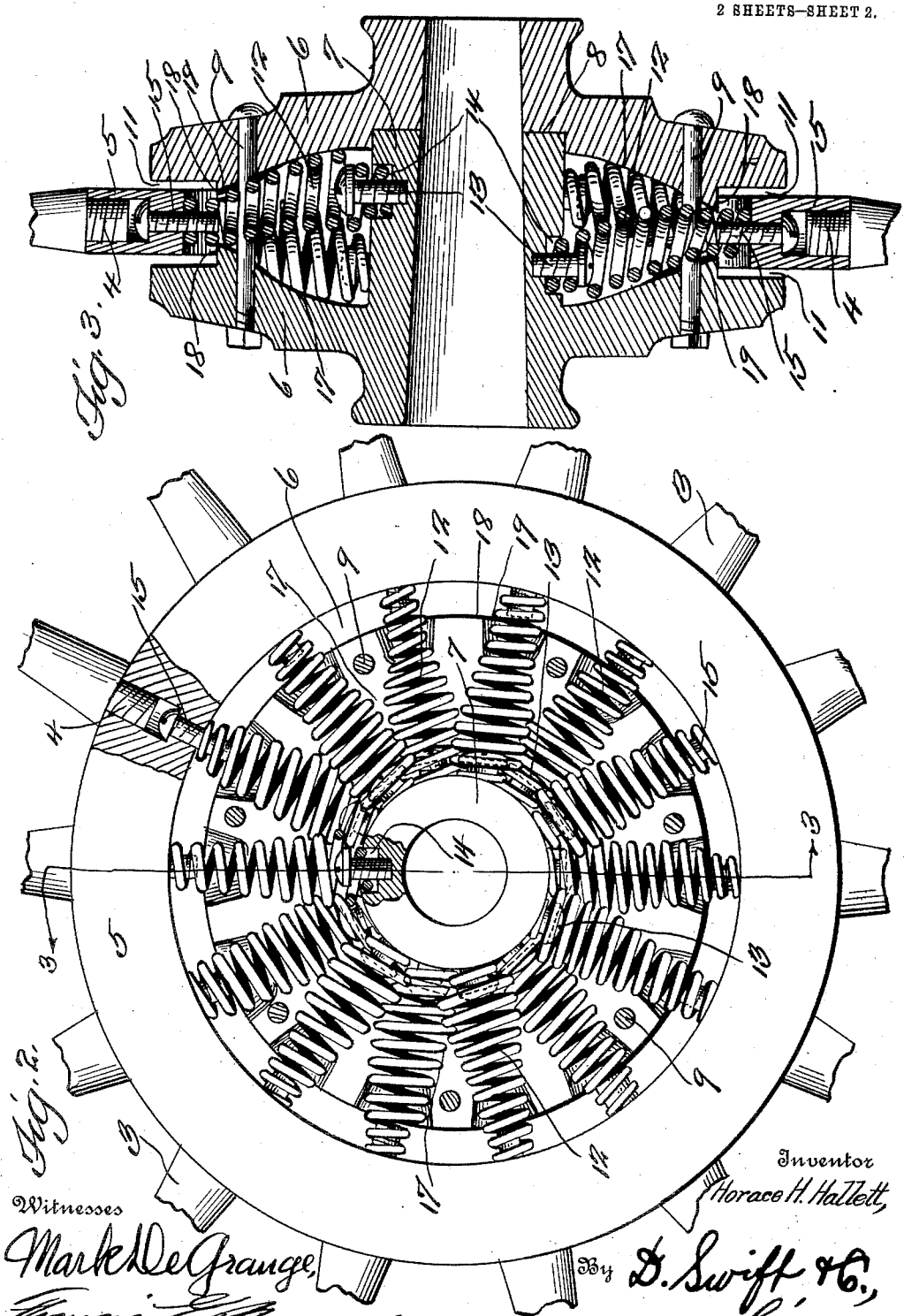

HORACE H. HALLETT, OF EASTON, PENNSYLVANIA.

SPRING WHEEL-HUB.

1,076,883.  Specification of Letters Patent.  Patented Oct. 28, 1913.

Application filed May 22, 1913. Serial No. 769,150.

*To all whom it may concern:*

Be it known that I, HORACE H. HALLETT, a citizen of the United States, residing at Easton, in the county of Northampton and State of Pennsylvania, have invented a new and useful Spring Wheel-Hub; and I do hereby declare the following to be a full, clear, and exact description of the invention, such as will enable others skilled in the art to which it appertains to make and use the same.

This invention relates to a new and useful improved spring wheel hub.

Heretofore there have been resilient or spring hubs designed, but not any which have been found desirable and practical, therefore no generic claim is made for such a hub. However, in the present application there is devised an exceedingly desirable simple yet efficient structure of hub, owing to having been found extremely practical through experience. Therefore, to these ends a resilient or spring hub is provided comprising an inner annual plate with an integral hub base, and an outer annular plate having a depression to receive one end of the hub base, and between which plates an annular ring is movably arranged, which is limited in its movements by the annular shoulders of said plates. A series of coil springs radiate from the hub base to which they are connected, their outer ends being secured to the intermediate movable ring, and to supply quite a number of the springs in order to lend strength and durability, yet afford resiliency and flexibility, the inner ends of the springs overlap or overlie one another partially. In arranging the springs in this manner, compression and expansion of the springs are afforded. The inner faces of the plate are gouged out or recessed to receive said springs, in order to hold them in position during their actions. The plates are secured together by screw bolts or other means, but not jammed next to the intermediate ring, there being a slight space intermediate the plates and the ring, to afford lateral yieldability and resiliency of the hub ring.

In some cases it may be found necessary to alter the details of construction, for instance, there may be two sets of springs provided, so that the hub may be used in connection with wheels to be used on heavy truck wagons and the like, or the hub base may be integral with one of the plates as before stated, and threaded to the other plate, or the hub base may be threaded to both plates in lieu of being integral with either of them. These and other similar alterations may be made, and to which the patentee is entitled, provided such alterations fall within the scope of what is claimed.

Another and very important feature of this structure is the fact that when the tire of the wheel strikes an obstruction, the tire or rim and the annular ring will yield annularly with respect to the hub base and the plates, incident to the sudden contact of the tire against the obstruction.

The invention comprises further features and combination of parts, as hereinafter set forth, shown in the drawings and claimed.

In the drawings—Figure 1 is a view in elevation of an automobile wheel constructed in accordance with the invention. Fig. 2 is an enlarged detail view of the spring or resilient hub, with one of the aforesaid plates removed, showing the bolts (which secure the base together) in section. Fig. 3 is a transverse sectional view. Fig. 4 is a detail view of the plate having the integral hub base. Fig. 5 is a detail view showing how the springs are secured to the hub base.

Referring more particularly to the drawings, 1 designates the usual wheel rim and 2 the tire, while 3 denotes the spokes, which are in turn threaded into or otherwise connected at 4 to the annular ring 5. This annular ring 5 is interposed between an inner and outer plate 6, one of which has an integral hub base 7, which fits a recess 8 of the other plate, the two plates are secured together by the bolts 9, only sufficient, however, as to leave a slight space intermediate the hub ring and the said plate. These spaces 11 allow the hub ring to move laterally slightly, incident to lateral strains on the wheel. Radiating from the hub base is a plurality of springs 12, their inner ends are secured in place by the screws 13, which are threaded into the hub base. The hub base, where each screw 13 is threaded therein, an annular recess 14 is formed to receive a portion of one end of each spring. The outer end of the springs taper slightly, and the inner diameters of the coils are just sufficient to receive the threaded ends of the bolts or screws 15, which are threaded in the hub ring. In this manner the springs are securely attached to the hub base and the hub ring, and by such a structure the hub ring is allowed to yield annularly, and especially owing to the overlapping or overlying of the inner ends of the springs the hub ring is allowed to yield laterally as well. The hub ring not only yields annularly, laterally, but also vertically, and owing to this vertical yieldability or movement, the compression and expansion of the springs are utilized. Owing to the arrangement of the inner ends of the springs, the plates are dished, as designated at 17, to accommodate this arrangement of the spring, which springs contact with the dished portions, but as will be noticed the outer portions of such plates do not contact with the hub ring, therefore the springs in addition to affording resiliency between the hub ring and the hub base also affords resiliency between said plates. The said plates are provided with annular shoulders 18 to limit the annular hub ring in its movement vertically. The annular plates adjacent their annular shoulders are gouged or grooved out to accommodate the outer portions of the springs.

The invention having been set forth, what is claimed as new and useful is:—

1. In combination, a pair of annular plates including a hub base between them, a hub ring intermediate the plates but spaced apart from them, a series of coil springs with their inner portions overlying one another connecting the hub ring and the hub base, and means for securing the plates together, the central portion of the inner face of each plate being dished, in which the contour of the arrangement of the springs is received and with which the springs contact, thereby holding the outer portion of the inner face of each plate spaced apart yieldably from the hub ring, the springs constituting means allowing the hub ring to yield annularly and laterally as well as allowing the plates to yield laterally.

2. In combination, a pair of annular plates, one including a hub base, while the other is provided with an annular recess to receive said hub base, a hub ring intermediate the plates but spaced apart from them, a series of coil springs with their inner portions overlying one another connecting the hub ring and the hub base, and means for securing the plates together, the central portion of the inner face of each plate being dished, in which the contour of the arrangement of the springs is received and with which the springs contact, thereby holding the outer portion of the inner face of each plate spaced apart yieldably from the hub ring, the springs constituting means allowing the hub ring to yield annularly and laterally as well as allowing the plates to yield laterally, said plates having annular shoulders to limit the hub ring in its vertical movement.

In testimony whereof I have signed my name to this specification in the presence of two subscribing witnesses.

HORACE H. HALLETT.

Witnesses:
JOHN H. BLAIR,
JNO. D. TRANSUE.

---

Copies of this patent may be obtained for five cents each, by addressing the "Commissioner of Patents, Washington, D. C."